Figure 1:
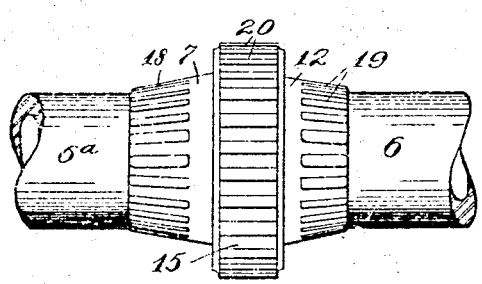

R. M. CORCORAN.
PIPE CONNECTION.
APPLICATION FILED JAN. 18, 1909.

956,294.

Patented Apr. 26, 1910.

Witnesses:
Nathan F. Futter.
Brennan B. West.

Inventor.
Richard M. Corcoran
By Bates, Fouts & Hull
Attys

UNITED STATES PATENT OFFICE.

RICHARD M. CORCORAN, OF CLEVELAND, OHIO.

PIPE CONNECTION.

956,294.	Specification of Letters Patent.	Patented Apr. 26, 1910.

Application filed January 18, 1909. Serial No. 472,815.

*To all whom it may concern:*

Be it known that I, RICHARD M. CORCORAN, a citizen of the United States, residing at Cleveland, in the county of Cuyahoga and State of Ohio, have invented a certain new and useful Improvement in Pipe Connections, of which the following is a full, clear, and exact description, reference being had to the accompanying drawings.

This invention relates to pipe couplings, and has for its object to provide a particularly efficient form of connection between a pipe of soft material, as lead, and another pipe of similar or of different material.

More limitedly speaking, the object of the invention is to provide a coupling of this character which will make an extremely efficient and tight connection without the necessity for the employment of wiped joints or of washers and which will provide a joint that will prevent leakage and at the same time will be particularly strong and durable.

I accomplish these results by the constructions illustrated in the drawings forming a part hereof, wherein—

Figure 2:
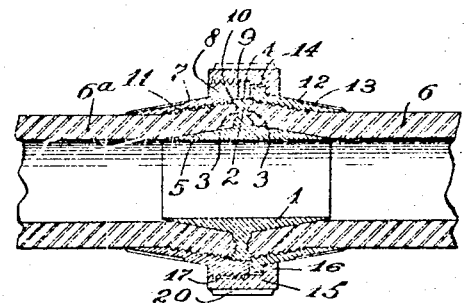
Figure 3:
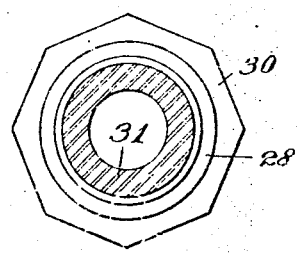
Figure 4:
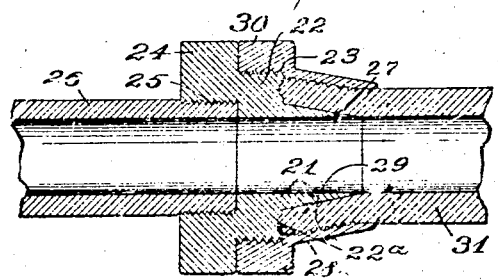
Figure 5:
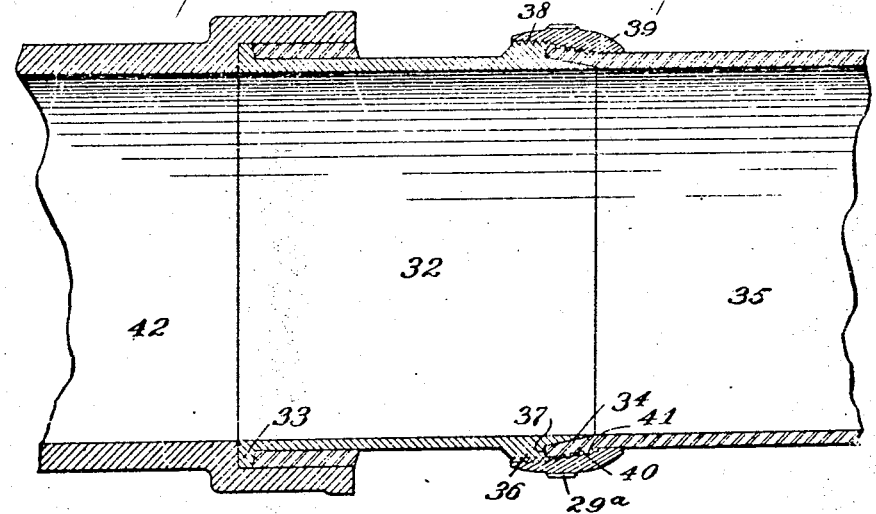

Figure 1 represents a side elevation of a coupling or connection constructed in accordance with my invention, showing the same applied for the purpose of connecting two lead pipes; Fig. 2 represents a longitudinal sectional view of the device shown in Fig. 1; Fig. 3 represents an end elevation of a form of my invention adapted for the connection of a lead pipe to a pipe of dissimilar material, as brass or iron; Fig. 4 represents a longitudinal sectional view of the device shown in the preceding figure; Fig. 5 represents a longitudinal sectional view through a thimble or ferrule, showing my invention employed for the purpose of securing a lead pipe thereto.

Describing the parts specifically and with particular references to Figs. 1 and 2, 1 denotes a combined support or base and joint-forming member, said member having a smooth bore adapted to form a continuation of the bores of the pipe sections connected thereto and having a central outwardly projecting circular rib or flange 2 provided in opposite faces thereof with annular recesses 3, 3 the outer portion of said rib or flange being smooth, as shown at 4. From the junction of this rib or flange 2 with the body of the member, said member tapers in opposite directions, forming on each side of said rib an inclined supporting surface or seat 5 for the adjacent flared end of a lead pipe, two of such pipes being shown at 6 and 6ª respectively. I have found in practice that a taper of about ten degrees for the seats or surfaces 5 is particularly efficient and enables the lead pipe to be readily adjusted bodily along such seats or surfaces.

With the base member 1, I employ three connecting members. One of these members 7 is a sleeve located on one side of the rib or flange 2, and another member, similar to member 7, is located on the opposite side of said rib or flange. The member 7 is provided with an externally threaded flange 8 at one end thereof and with a tapered outer surface extending from said flange. On the interior of the flanged end of the sleeve 7 there is provided an annular recess 9 for the reception of the outer edge 4 of the rib or flange 2. The recess 9 is provided with a short inwardly-projecting shoulder 10, which forms an abutment for one edge of the flange 2. From the shoulder 10, the inner surface of the connecting member 7 is tapered complementarily to the outer surface of the base member 1 and is provided with a shallow internal thread 11 in such tapered portion. At the outer end of the thread 11, the inner surface of the member 7 extends substantially parallel with the axis of the pipe section 6ª. The second connecting member is shown at 12 and comprises a sleeve similar to the member 7 as to inclination and as to shallow internal thread 13. At its inner end, the member 12 is provided with an outwardly projecting flange 14 which is adapted to abut against the adjacent outer edge of the flange 2 in the same manner as said flange is engaged by the shoulder 10 of the member 7. The third connecting member comprises the nut 15, which nut is provided with an inwardly projecting flange 16 having a tapered inner surface conforming to and adapted to slide upon the outer surface of member 12, said flange being adapted to engage the flange 14 on said member 12. The opposite end of the nut is provided with an internal thread 17 adapted to engage the external thread on the flange 8.

In applying this coupling to the lead pipe sections 6 and 6ª, the members 7 and 12 are first slipped over the ends of the pipe sections, the nut 15 being applied to the section 12. The adjacent ends of the pipe sections are then flared outwardly to enable them to slip over the inclined ends of the supporting member or base 1 and are slipped along said inclined ends until the ends of the pipe sections abut against the rib or flange 2 as closely as possible. The members 7 and 12 are then slipped along the flared ends of the pipe sections 6 and 6ª as far as they can be moved conveniently by hand, which will ordinarily be sufficiently far to enable the nut 17 to be threaded onto the flange 8. As will be seen from the drawings, the members 7 and 12 are each provided with a series of external corrugations or recesses, indicated at 18 and 19 respectively, said corrugations or recesses being for the reception of a wrench of the Stilson type. By means of such wrenches, these members may be threaded along the flared ends of their respective pipe sections. The internal threads 11 and 13 are very shallow. In practice I have found that a depth of 1/64 inch for such threads is very satisfactory. This shallowness or lightness of thread prevents these members from being stopped in their movement by hand along the pipe sections until each member is nearly in its fully adjusted position. By the application of a wrench to each of said members, these members are adjusted farther along the tapered pipes and the action of their light threads or projections on the pipe sections is to force the pipe sections along the slightly tapered base, equalizing the thickness of the pipe section ends and forcing the ends of such sections into the recesses 3, with the result that the soft metal of each section is forced into the recesses 3 so tightly as to take the shape of said recesses and to form a washer of the metal itself between the end of each section and the rib or flange 2. The nut 15 is provided with corrugations or recesses 20 for the application of a wrench of the Stilson type thereto. By tightening up this nut, the members 7 and 12 are held against displacement and an extremely tight and efficient joint is provided between the ends of the pipe sections and the central supporting member 1.

The form of my invention shown in Figs. 1 and 2 is particularly useful in connecting the ends of pipes in more or less inaccessible places, as for instance in a trench. When it is desired to tighten up the nut 15 or either of the members 7 and 12, wrenches may be applied to said members which will prevent either of them and the pipe sections connected thereto from turning during the operation of tightening said nut or said members.

In Figs. 3 and 4 there is shown a modification of my invention which is adapted for connecting a lead pipe to a pipe of dissimilar material, such as iron or brass. In the modification shown in these figures, but two connecting members are employed, namely, a recessed base member and a coöperating internally threaded clamping member. Referring by numerals to said figures, 21 denotes the base member, the same comprising a tubular body provided with a smooth inner surface adapted to form a continuation of the bores of the pipe sections to which it is connected. Near one end of said bore the body 21 is provided with an outwardly projecting flange 22, provided with an external thread 23. The flange 22 is conveniently formed as a cylindrical projection from the larger angular flange 24, the latter flange having a threaded bore 25 of greater diameter than the bore of the main part of the body 21. The threaded bore 25 is for the reception of the pipe section 26, which is of rigid material, as iron or brass. The flange 22 is provided in the face opposite the flange 24 with an annular recess 22ª. From the inner periphery or base of the flange 22, the surface of the body 21 tapers inwardly or toward the bore, as shown at 27, in the same manner as the surface of the base of supporting member 1. 28 denotes a sleeve, the inner surface whereof is tapered complementarily to the inclination of the surface 27 of the support 21. The inner surface of this sleeve is provided with a light or shallow thread 29, similar to the threads of the members 7 and 12. The flared end of the sleeve 28 merges with a nut 30 which is provided with a threaded bore adapting it to be fitted onto the threads 23 of the flange 22. In connecting the lead pipe 31 to a rigid pipe 26, the mode of operation is similar to that employed in connecting the two sections of lead pipe shown in Figs. 1 and 2. The rigid pipe is simply threaded into the base member 21. The combined sleeve and nut (28, 30) is slipped onto the end of the lead pipe, said pipe is then flared outwardly and applied to the tapered surface 27 of the base 21. The nut 30 is threaded onto the flange 22, and the adjustment of the nut causes the threads 29 to cut into the lead pipe, equalizing the thickness of said pipe between the base and the sleeve and compacting the end of the pipe into the annular recess 22ª, forming a washer from the lead itself which effectively prevents any leakage at the joint between the coupling and the lead pipe.

In Fig. 5 there is shown a still further modification of my invention, illustrating the manner in which a lead pipe may be connected to a ferrule. In this modification, the end of the ferrule forms one of the connecting members corresponding to the combined base and connector 21 in Fig. 4. In the last-mentioned figure, 32 denotes a ferrule, the same being provided at one end with the customary flange 33 and having its opposite end tapered, to provide an inclined seat 34 for the adjacent end of the lead pipe 35. The inner end of the tapered surface 34 merges with a flange 36 having an annular recess 37 in the wall thereof which faces the adjacent end of the ferrule, and said flange is provided on its outer periphery with a screw-thread 38. The end of the ferrule which is provided with the inclined surface 34, flange 36 and recess 37 corresponds functionally to the element 21 of the preceding modification of my invention. 39 denotes a combined nut and clamping member or sleeve, the same being provided with a tapered inner surface 40 having light or shallow screw threads 41 on the interior thereof. The end of the member 39 which projects inwardly or toward the central portion of the ferrule 32 is provided with a thread adapted to mesh with the thread 38 on the flange 36. The operation of connecting the lead pipe to the end of the ferrule is substantially the same as that of connecting the lead pipe to the end of the body 31 in the preceding modification. The light or shallow threads on the inner surface of member 39 equalize the thickness of the lead pipe between the interior of the member 39 and the tapered surface 34 and said threads force the upper or flared end of the lead pipe firmly into the annular recess 37, forming from the pipe a washer of the same material which effectually prevents leakage at the joint. The opposite end of the ferrule is shown as calked into a conduit of rigid material, as iron or brass, 42. The member 39 is provided in its outer surface with a series of corrugations or recesses 29ª for the reception of a wrench of the Stilson type, as is the case with the nut 15 in Figs. 1 and 2.

The constructions shown herein disclose very efficient forms of connections between two lead pipes and between a pipe of lead and a pipe of other material. The connection dispenses with the necessity for wiped joints and is particularly efficient both as to strength and anti-leaking qualities.

In all forms of my invention disclosed herein, the supporting surfaces or seats shown at 5, 27, and 34 are of slight taper or inclination. As previously stated, a taper of about 10 degrees has been found to be very efficient, as this provides comparatively long supporting surfaces for the ends of the lead pipes, enables the pipes to be forced along the surfaces by the threads or projections on the interior of the sleeves, and at the same time makes it unnecessary to flare the ends of the pipes to such an extent as to thin the metal and reduce the strength, as is the case with other constructions with which I am familiar. It is unnecessary to reduce the thickness of the ends of the pipes in order to apply them to the support. Furthermore, in all forms of my invention the sleeves, when adjusted, are in substantial engagement with the outer surface of the flange against which the ends of the lead pipes abut. This confines the ends of the pipes as they are compacted against the outwardly projecting flange by the sleeves having the shallow threads, and enables a washer to be formed, between the flange and the sleeve, from the metal of the pipe itself.

Having thus described my invention, what I claim is:

1. The combination, with the flared end of a lead pipe, of a connecting device, said device comprising a body having a tapered supporting surface for the flared end of said lead pipe and an outwardly projecting flange at the enlarged end of such tapered surface, said flange being provided with an annular recess in the face presented toward said pipe, and a sleeve surrounding the flared end of the pipe and having an internal surface tapered complementarily to the inclined surface of the supporting body and provided on such tapered internal surface with an internal thread and provided with a portion adapted to be brought into substantial engagement with the outer surface of said flange.

2. The combination, with the flared end of a lead pipe, of a connecting device, said device comprising a body having a tapered supporting surface for the flared end of said lead pipe and an outwardly projecting flange at the enlarged end of such tapered surface, said flange being provided with a recess in the face presented toward said pipe, and a sleeve surrounding the flared end of the pipe and having an internal surface tapered complementarily to the inclined surface of the connecting device and provided with means adapted to engage the flared end of said pipe and force the end into said recess and provided with a portion adapted to be brought into substantial engagement with the outer surface of said flange.

3. The combination, with a supporting member having an internal bore and having an outer surface tapering toward said bore, of a flange projecting from said tapered surface at the flared or widened end thereof and provided between such surface and its outer periphery with a recess, a lead pipe having a flared end fitted on the inclined surface of said support, and a sleeve on the flared end of said pipe and having its inner surface flared or tapered complementarily to the tapered outer surface of said support and having a shallow thread adapted to engage the pipe, and means whereby said sleeve may be rotated with respect to said pipe and said support, said sleeve being adapted to form with said flange a closed space confining the flared end of the pipe.

4. The combination, with a supporting member having an internal bore and having an outer surface tapering toward said bore, of a flange projecting from said tapered surface at the flared or widened end thereof and provided between such surface and its outer periphery with an annular recess, a lead pipe having a flared end fitted on the inclined surface of said supporting member, a sleeve on the flared end of said pipe and having its inner surface flared or tapered complementarily to the tapered outer surface of said member and having a shallow thread adapted to engage the pipe, and a nut for moving said sleeve along the flared end of said pipe, the sleeve being arranged to form with the flange a closed space confining the flared end of said pipe.

5. As a means for connecting a lead pipe with a pipe of dissimilar material, the combination of a base member having a connection for the latter pipe, an outwardly projecting flange having a thread on its outer surface and a recess intermediate of the inner and outer peripheries thereof and a tapered surface extending from the recessed side of said flange, and a sleeve having its interior tapered complementarily to the tapered surface of the base member and provided in such tapered interior with means adapted to engage the lead pipe, said sleeve having an internally threaded projection adapted to engage the threaded flange on the base member.

6. As a means for engaging a lead pipe with a pipe of dissimilar material, the combination of a base member having at one end a connection for the latter pipe, said member also having an outwardly projecting flange provided with a thread on its outer surface and an annular recess intermediate of the inner and outer peripheries thereof and a tapered surface extending from the recessed side of said flange, and a sleeve having its interior tapered complementarily to the tapered surface of the base member and provided with a shallow screw thread, said sleeve having an internally threaded projection adapted to engage the threaded flange on the base member.

7. The combination, with a lead pipe and a pipe of rigid material, of means for connecting said pipes, said means comprising a base member having a connection for the latter pipe and having a slightly tapered surface, a flange projecting outwardly from the widened end of the tapered surface and having its outer surface provided with a screw thread, and a sleeve having its interior surface tapered complementarily to the tapered surface of the base member and provided on such interior surface with a shallow screw thread and having an internally threaded extension adapted to engage the thread on the outer surface of said flange, the lead pipe having a flared end inserted between the tapered base and the sleeve.

8. The combination, with the flared end of a lead pipe, of a connecting device, said device comprising a body having a supporting surface for the pipe, said surface having a slight taper and said body being provided at the widened end of said surface with an outwardly projecting flange having a recess in the outwardly projecting face thereof, and a sleeve surrounding the flared end of the pipe and having an internal surface tapered complementarily to the inclined surface of the supporting body and provided with a shallow internal thread on such tapered internal surface and having a portion adapted to confine the flared end of the lead pipe while the sleeve is being adjusted toward said flange.

9. The combination, with the flared end of a lead pipe, of a connecting device, said device comprising a body having a tapered supporting surface for the flared end of said pipe and an outwardly projecting flange adjacent to the enlarged end of said surface, and a sleeve surrounding the flared end of said pipe and having an internal surface tapered complementarily to the inclined surface of the supporting body and provided in such surface with one or more projections adapted to engage said pipe, to force the same along said body toward said flange, the tapered surface of said body being substantially unobstructed and the taper of said body being slight to permit the longitudinal movement of the pipe end therealong by the adjustment of the sleeve, the sleeve being arranged to form with the flange a closed space confining the flared end of said pipe, and means whereby the sleeve may be adjusted toward the flange.

In testimony whereof, I hereunto affix my signature in the presence of two witnesses.

RICHARD M. CORCORAN.

Witnesses:
J. B. HULL.
BRENNAN B. WEST.